No. 794,298. PATENTED JULY 11, 1905.
W. S. HAMM.
LANTERN.
APPLICATION FILED OCT. 15, 1904.
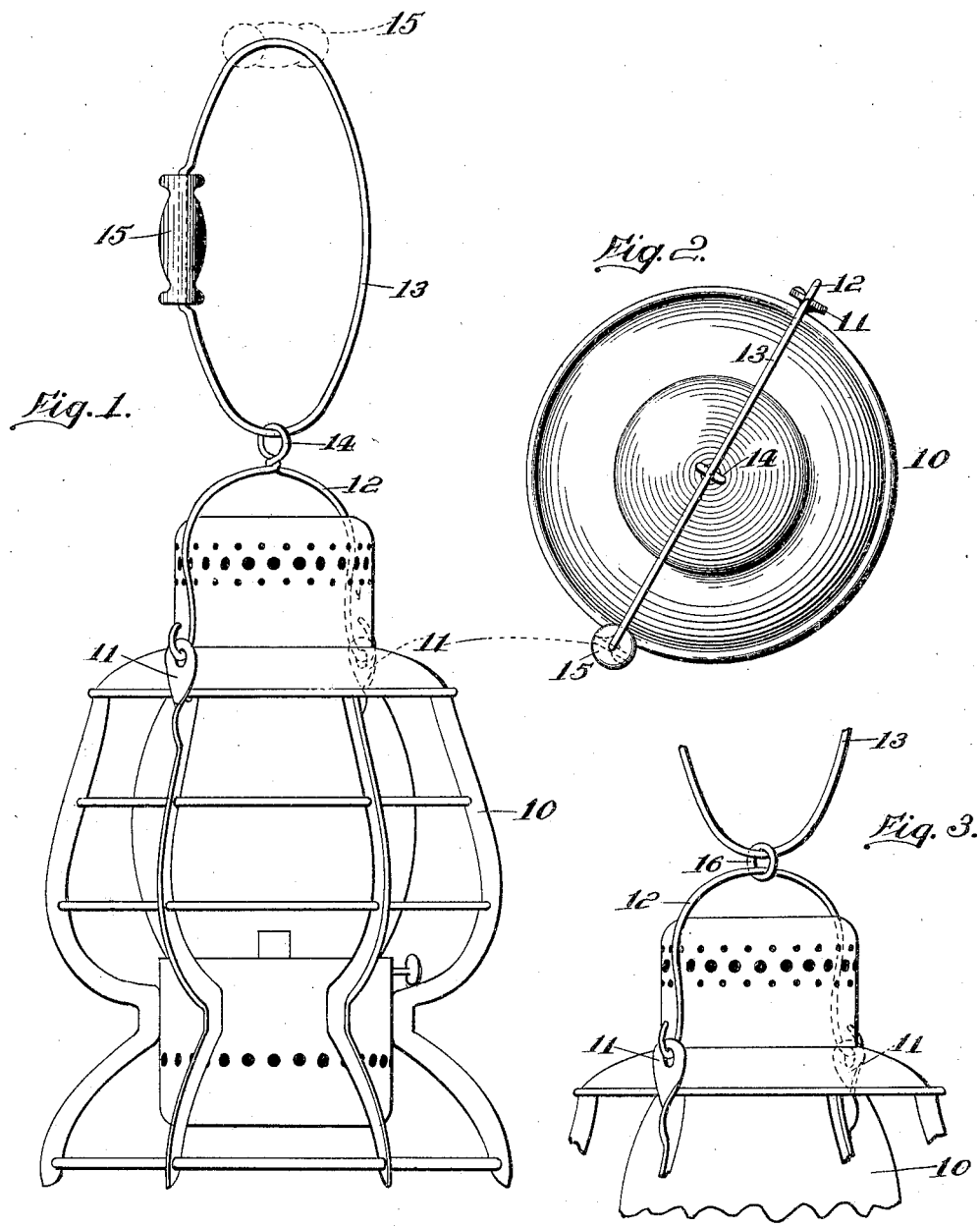
Witnesses:
Chas. B. Gillson.
Wm. M. Cathcar.
Inventor.
William S. Hamm.
By Louis K. Gillson, Atty.

No. 794,298.

Patented July 11, 1905.

UNITED STATES PATENT OFFICE.

WILLIAM S. HAMM, OF LAKESIDE, ILLINOIS.

LANTERN.

SPECIFICATION forming part of Letters Patent No. 794,298, dated July 11, 1905.

Application filed October 15, 1904. Serial No. 228,594.

*To all whom it may concern:*

Be it known that I, WILLIAM S. HAMM, a citizen of the United States, and a resident of Lakeside, county of Cook, and State of Illinois, have invented certain new and useful Improvements in Lanterns, of which the following is a specification and which are illustrated in the accompanying drawings, forming a part thereof.

The invention relates more particularly to lanterns intended for the use of trainmen, and is intended to the better adapt such lanterns for the purposes of signaling, the bail being so formed that the lantern always maintains a vertical position, even though it may be swung and held by its bail outwardly at arm's length.

The invention consists in the structure hereinafter described, and which is illustrated in the accompanying drawings, in which—

Figure 1 is an elevation of a lantern of common form with the improved bail applied thereto and is shown in perspective, one of its positions being shown in solid and another in dotted lines. Fig. 2 is a plan view, the parts being in the solid-lines position of Fig. 1; and Fig. 3 is a modified form showing the construction of the bail.

The lantern is shown at 10 and may be of any desired form, its bail-lugs being shown at 11 11. The bail proper is shown at 12 as being made of a piece of wire hooked into the lugs 11 and being of sufficient size to clear the top of the lantern in all of its positions, but not being intended to serve as a handpiece.

The grip member of the bail is shown at 13 and is in the form of a loop or ring, loosely or slidingly engaging the member 12. Preferably the bail member 12 is provided with a fixed loop 14 midway between its ends, and the member 13 passes loosely through the loop thus formed. The grip member 13 may be provided with a handpiece 15, secured against circumferential movement, and in order that the bail may lie flat against the body of the lantern when not in service the loop 14 is preferably transverse to the plane of the member 12.

If desired, in lieu of the loop 14, formed integral with the member 12 of the bail, there may be employed a link 16, through which both the members 12 and 13 of the bail loosely pass.

The grip member 13 of the bail may be, and preferably is, made of sufficient size to permit the arm of the user to pass through it, so that it may be conveniently carried between the arm and the breast, as is the common practice with train conductors when collecting fares.

When in use, the body of the lantern is at all times vertical, as its weight naturally carries the loop 14 or 16 to the bottom of the grip member 13. When the lantern is swung loosely at the side of the user, the grip member assumes the position indicated by dotted lines, Fig. 1, and when it is swung or held up in the act of signaling the parts will assume the position indicated by solid lines in Fig. 1.

The invention admits of the use of a strong flame, impracticable when the body of the lantern is inclined in the giving of signals, for the reason that the flame is caused to impinge against the globe and quickly coats it with carbon, and this obscures the light.

I claim as my invention—

1. In combination, a lantern; a bail hinged thereto; and a grip member in loop form slidingly engaged with the bail and disposed in parallel plane therewith.

2. In combination, a lantern; a wire bail hinged thereto and twisted between its ends to form a loop transverse to the plane of the bail; and a grip member in loop form engaging such transverse loop.

3. In combination, a lantern, and a sectional bail therefor, one member of the bail being hinged to the lantern and the other member thereof being in sliding engagement and in parallel plane with the hinged member.

WILLIAM S. HAMM.

Witnesses:
CHARLES B. GILLSON,
JOHN A. MOSHER.